United States Patent
Hsu

(10) Patent No.: US 7,105,935 B2
(45) Date of Patent: Sep. 12, 2006

(54) DEVICE OF MICRO VORTEX FOR FERROFLUID POWER GENERATOR

(75) Inventor: Li-Chieh Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 46 days.

(21) Appl. No.: 11/041,945

(22) Filed: Jan. 26, 2005

(65) Prior Publication Data

US 2006/0110260 A1    May 25, 2006

(30) Foreign Application Priority Data

Nov. 23, 2004    (TW) .............. 93135938 A

(51) Int. Cl.
    *H02K 44/00*    (2006.01)
(52) U.S. Cl. .......................... 290/2; 310/11
(58) Field of Classification Search .......... 290/2; 310/11
    See application file for complete search history.

(56) References Cited

U.S. PATENT DOCUMENTS

| 476,983 | A | * | 6/1892 | Edison ................ 310/306 |
| 3,906,415 | A | * | 9/1975 | Baker ................. 335/47 |
| 4,064,409 | A | | 12/1977 | Redman ............... 310/306 |
| 6,225,705 | B1 | * | 5/2001 | Nakamats ............. 290/43 |
| 6,489,694 | B1 | | 12/2002 | Chass ................ 310/11 |
| 6,504,271 | B1 | | 1/2003 | Chass ................ 310/11 |
| 6,982,501 | B1 | * | 1/2006 | Kotha et al. .......... 310/11 |
| 2004/0182099 | A1 | * | 9/2004 | Hsu ................. 62/259.2 |

FOREIGN PATENT DOCUMENTS

| JP | 61176630 A | * | 8/1986 |
| JP | 07231643 A | * | 8/1995 |
| SU | 1355770 A2 | * | 11/1987 |

OTHER PUBLICATIONS

Gazeou et al., Energy Conversion in Ferrofluids, Physical Review, Jul. 1977.*

* cited by examiner

*Primary Examiner*—Joseph Waks
(74) *Attorney, Agent, or Firm*—Troxell Law Office, PLLC

(57) ABSTRACT

A ferrofluid power generator with micro vortex generator is disclosed, which is capable of generating an induced current by enabling a ferrofluid having a plurality of magnetic particles to flow in a closed circuit, the device comprising a vortex generator and a induced current unit. The vortex generator further comprises a first inlet, a first outlet and a plurality of cavities, which is capable of accelerating the rotation speed of the magnetic particles by virtue of employing the plural cavities to enable the magnetic particles to rotate while the ferrofluid passing through the plural cavities. The induced current unit is substantially a tube having a second inlet and a second outlet, where the second inlet is coupled to the first outlet of the vortex generator for accepting the ferrofluid with rotating magnetic particles to flow therein and through so as to induce a change of magnetic flux to occur and generate an induced current accordingly.

19 Claims, 5 Drawing Sheets

DEVICE OF MICRO VORTEX FOR FERROFLUID POWER GENERATOR

FIELD OF THE INVENTION

The present invention relates to an electromagnetic power generator, and more particularly, to a ferrofluid power generator with micro vortex generator, in which the flowing of magnetic particles in a ferrofluid are accelerated by virtue of increasing the rotation of the same so as to enable the magnetic flux in a loop of wire to change according, where an induced current is generated.

BACKGROUND OF THE INVENTION

There are many types of electrical generators, most of which convert thermal energy to fluid energy to mechanical energy to electrical energy. The principal sources of electrical power convert thermal energy generated by burning coal or gas or by atomic fission to superheated steam which is then converted to rotary mechanical power through a turbine which, in turn, drives an electromechanical generator.

It has also been proposed to use a closed loop ferrofluid system to drive a turbine for generation of power. In such a system, ferrofluids that undergo large changes in their magnetic properties with temperature are subjected to heating and cooling at separate points of the closed loop so that, by use of an electromagnet, a self-pumping action can be created which may be used to drive the turbine. Nevertheless, these prior art electrical generators employ a plurality of large-sized mechanically moving elements for generating electricity, that are difficult to maintain, repair, and operate quiet with little vibration. In this regard, these prior art electrical generators have limited usages especially in the apparatuses requiring high precision, which are mostly powered by battery.

In view of the above description, there are several prior-art devices dealing with the matter. Namely, a ferrofluidic electrical generator is disclosed at U.S. Pat. No. 4,064,409, titled "FERROFLUIDIC ELECTRICAL GENERATOR" by Charles M Redman, which is an electrical generator utilizing heating and cooling of separate points in a closed circuit ferrofluid system for enabling the ferrofluid therein to experience rapid change in their magnetic properties with temperature and thus generate an induced current by virtue of the change of rate of magnetic flux, so as to achieve the object of simplifying the generation of electrical power by eliminating the mechanical stages and directly from heat energy. Nevertheless, the referring ferrofluidic electrical generator posses shortcomings list as following:

(1) The flowing of the ferrofluid circulating the closed loop of the referring generator is comparatively slow since it is enabled only by the rapid magnetic properties change with respect to temperature change, and as the consequence, the electric power generated by the referring generator is not preferred since the induced current is proportional to the rate of change of the magnetic flux which is correspondence to the velocity of magnetic particles in the ferrofluid.

(2) The temperature change of the ferrofluid of the referring generator is enabled by thermal conduction, which is not efficient enough to cause rapid magnetic properties change and thus is not able to induce sufficient magnetic flux change for generating preferred induced current.

Another prior-art electrical generator as disclosed at U.S. Pat. No. 6,504,271 and U.S. Pat. No. 6,489,694, both by Jacob Chass, is a ferrofluidic electromagnetic power generator installed within a rotating object, such as the interior of a vehicular tire, capable of generating electric current in an electrical coil wound about an elongated, hermetically sealed housing made of non-magnetic material, partially filled with magnetized ferrofluid, by which rotation and horizontal velocity of the tire will agitate and propel the magnetized ferrofluid within the sealed housing enabling the magnetic particles in the ferrofluid to rotate and move and thus causing induction in the electrical coil with respect to the change of rate of magnetic flux.

Yet, another prior-art electrical generator is as disclosed by F. Gazeau in Physical Review p. 614–618 (1997). The foregoing electrical generator submits a $CoFe_2O_4$ ferrofluid in rigid rotation (and then in a Couette flow) to an alternating magnetic field, by which the magnetic particles in the ferrofluid behave as nanomotors or nanogenerators depending on the relative values of fluid vorticity and field frequency. It demonstrates the energy conversion between the magnetic and kinetic degrees of freedom of the particles. The effect of a hydrodynamic shear on the spectrum of relaxation times evidences an intimate structure of the ferrofluid consisting of small chains of dipoles. Nevertheless, the generator utilizing Couette flow effect requires to have an additional energy exerting thereon for causing a set of concentric cylinders to rotate relatively, which is not preferable.

Therefore, the present invention considers the abovementioned shortcomings and desires to come up with a ferrofluid power generator with micro vortex generator capable overcoming the same.

SUMMARY OF THE INVENTION

It is the primary object of the invention to provide a ferrofluid power generator with micro vortex generator, in which the rotation of magnetic particles in a ferrofluid are accelerated by virtue of generating vortex so as to enhance the efficiency of electric power generation.

It is another object of the invention to provide a ferrofluid power generator with micro vortex generator, which employs a magnetic filed array for increasing magnetic field homogeneity so as to enhance the efficiency of electric power generation.

A further object of the invention is to provide a ferrofluid power generator with micro vortex generator, that simplifies the system of electric power generation by employing a ferrofluidic means for generating electric power.

It is yet another object of the invention to provide a ferrofluid power generator with micro vortex generator, that is capable of generating electric power with comparatively reduced noise, reduced vibration by a ferrofluidic means and has a comparatively wider range of application.

To achieve the above objects, the present invention provides a ferrofluid power generator with micro vortex generator that is capable of generating an induced current by enabling a ferrofluid having a plurality of magnetic particles to flow in a closed circuit, the device comprising a vortex generator and an induced current unit. The vortex generator further comprises a first inlet, a first outlet and a plurality of cavities, which is capable of accelerating the rotation speed of the magnetic particles by virtue of employing the plural cavities to enable the magnetic particles to rotate while the ferrofluid passing through the plural cavities. The induced current unit is substantially a tube having a second inlet and a second outlet, where the second inlet is coupled to the first outlet of the vortex generator for accepting the ferrofluid with rotating magnetic particles to flow therein and through so as to induce a change of magnetic flux to occur and generate an induced current accordingly.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

As described in Faraday's law, any change in the magnetic environment of a coil of wire will cause a voltage (emf) to be "induced" in the coil. No matter how the change is produced, the voltage causing an induced current will be generated. The change could be produced by changing the magnetic field strength, moving a magnet toward or away from the coil, moving the coil into or out of the magnetic field, rotating the coil relative to the magnet, etc.

It is noted that the induced current is proportional to the rate of change of the magnetic flux. That is, the size of the induced current can be made bigger by the means list as following: (1). Using a stronger magnet. (2). Moving the magnet at a faster speed. (3). Using more turns of wire on the coil.

Figure 1:
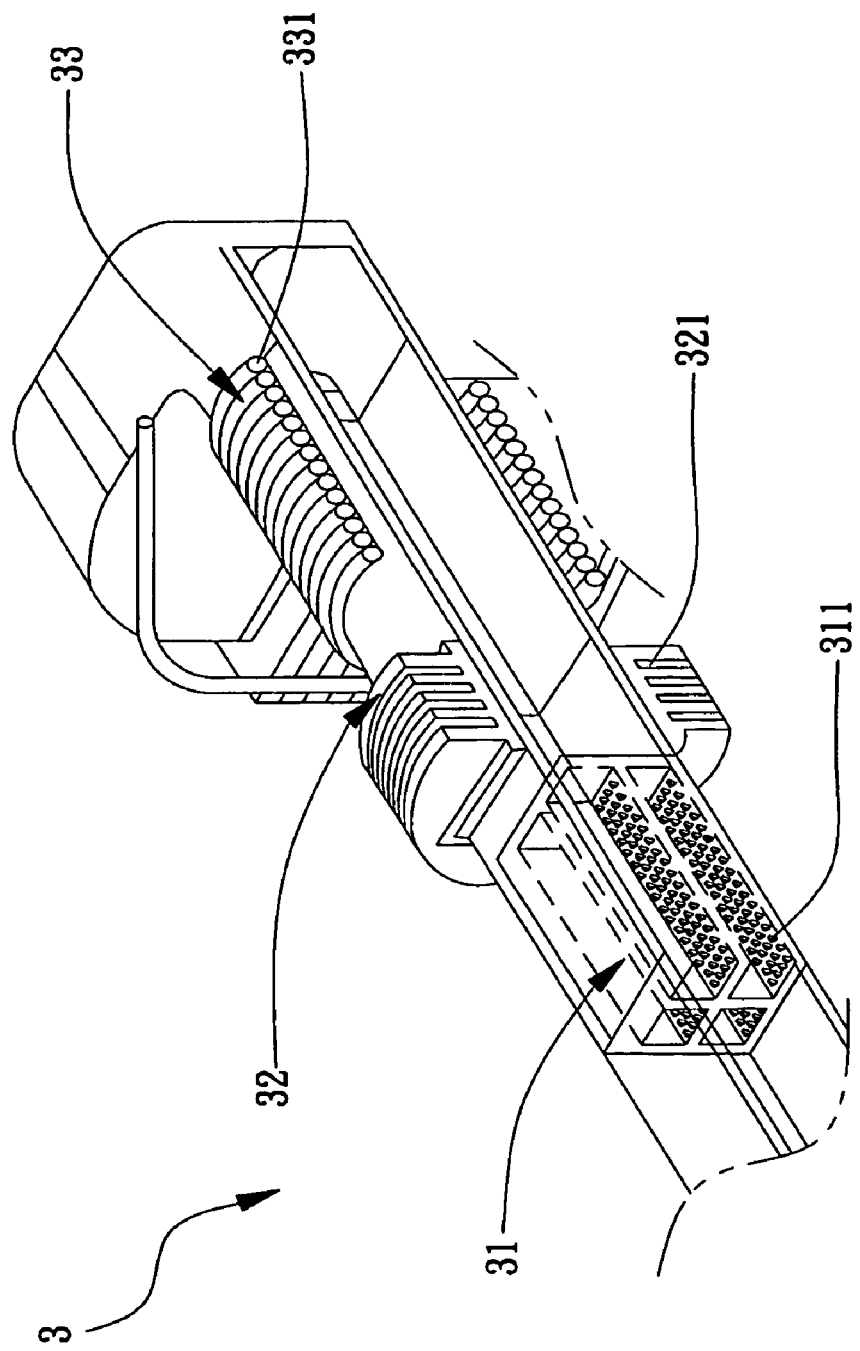
FIG. 1 is a three dimensional representation showing a ferrofluid power generator with micro vortex generator according to a preferred embodiment of the present invention.

Please refer to FIG. 1, which is a three dimensional representation showing a ferrofluid power generator with micro vortex generator according to a preferred embodiment of the present invention. The ferrofluid power generator 3, being substantially a tube, comprises a vortex generator 31, a magnetic matrix filed array 32 and an induced current unit 33, being sequentially arranged. Moreover, the vortex generator 31 further comprises a plurality of cavities arranged therein, and the magnetic field array comprises a permanent magnetic 321 disposed surrounding the outer rim of the tube, and the induced current unit 33 comprises a coil 331 wrapping around the outer rim of the tube, capable of generating an induced current thereon while sensing the change of magnetic flux.

Figure 2:
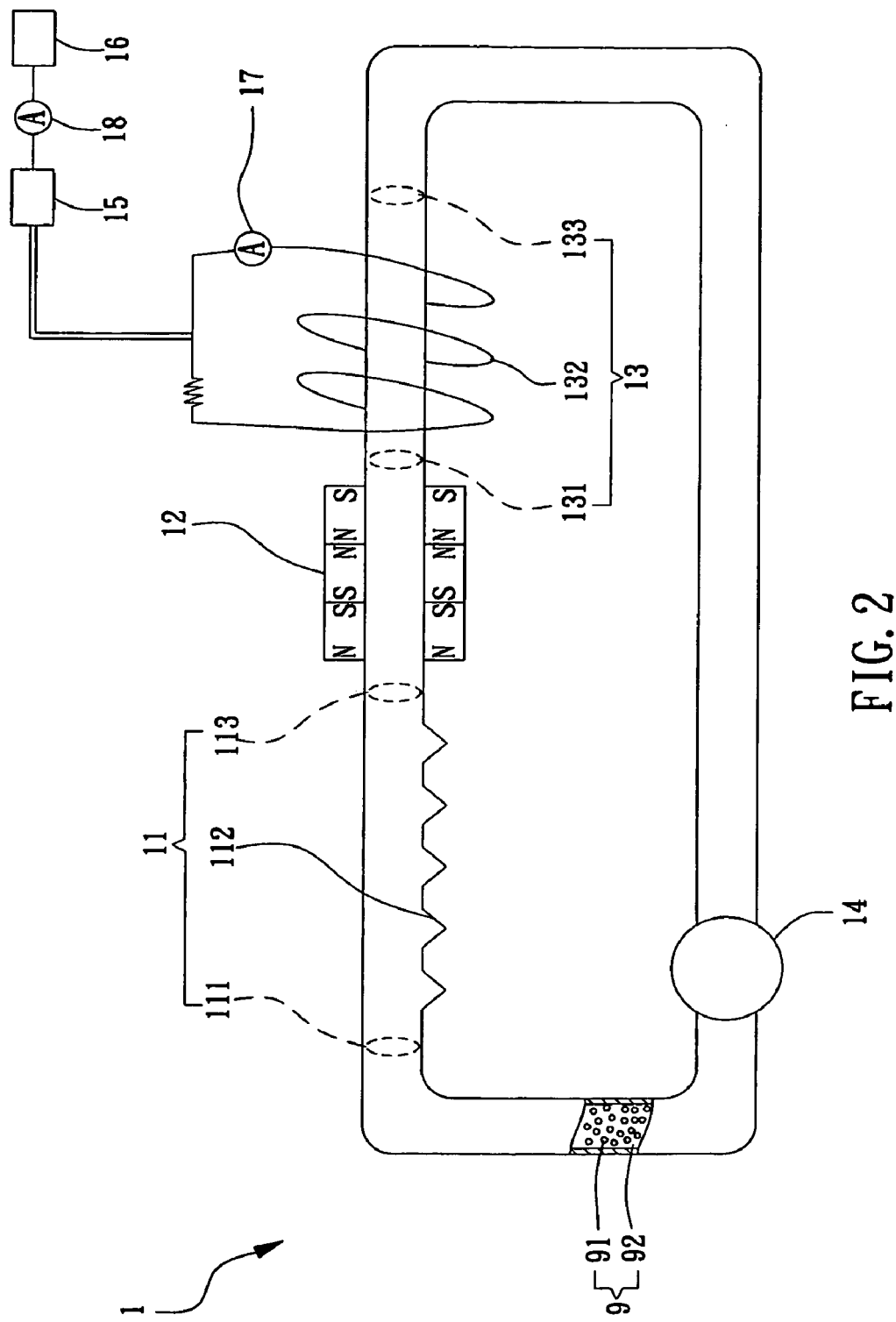
FIG. 2 is a schematic illustration showing the circulation in the ferrofluid power generator with micro vortex generator according to a preferred embodiment of the present invention.

Please refer to FIG. 2, which is a schematic illustration showing the circulation in the ferrofluid power generator with micro vortex generator according to a preferred embodiment of the present invention. The ferrofluid power generator 1 of FIG. 2 is capable of generating an induced current 17 while a ferrofluid 9 is circulating therein. The ferrofluid 9 is composed of a plurality of magnetic particles 91 and a fluid 92, wherein the magnetic particle 91 can be a magnetized nano-scale dipole iron particle or other nano-scale dipole particle, and the fluid 32 can be a non-electrolysis chemical coolant like a fluoride liquid with low boiling point, which can be selected from the group consisting of FC-87, PF-5052, FC-72 and the mixture thereof. The ferrofluid power generator 1 comprises a vortex generator 11, a magnetic field array 12, an induced current unit 13, a pump 14, a rectifier 15 and an actuator 16, together forming a closed circuit having the ferrofluid 9 circulating therein. The vortex generator 11 further comprises a first inlet 111, a first outlet 113 and a plurality of cavities 112, capable of accelerating the rotation speed of magnetic particles 91 in a ferrofluid 9 flowing therethrough by virtue of employing the plural cavities 112 to enable the magnetic particles 91 to rotate while the ferrofluid 9 passing through the plural cavities 112.

The induced current unit 13 is substantially a tube having a second inlet 131 coupled to the first outlet 113 of the vortex generator 11, a second outlet 133, and a micro-scale copper coil 132 wrapping around the outer rim thereof, and is capable of accepting the ferrofluid 9 with rotating magnetic particles 91 to flow therein and through so as to induce a change of magnetic flux to occur and generate an induced current 17 accordingly. The magnetic field array 12 may be a permanent magnetic and is connected to the first outlet 113 by an entrance thereof and being connected to the second inlet 131 by an exit thereof, wherein the magnetic field array is used for providing an evenly distributed magnetic filed so as to enable the plural magnetic particles to rotate in synchronization. The pump is connected in a way to be sandwiched between the first inlet 111 and the second outlet 133 so as to provide power for driving the ferrofluid 9 to circulate the formed closed circuit. The rectifier 15 is used for converting the induced current 17, which may be an alternating current with high frequency, into a direct current 18 to be fed into the actuator 16, such that the actuator 16 can execute all sorts of functions at will.

Figure 3A:
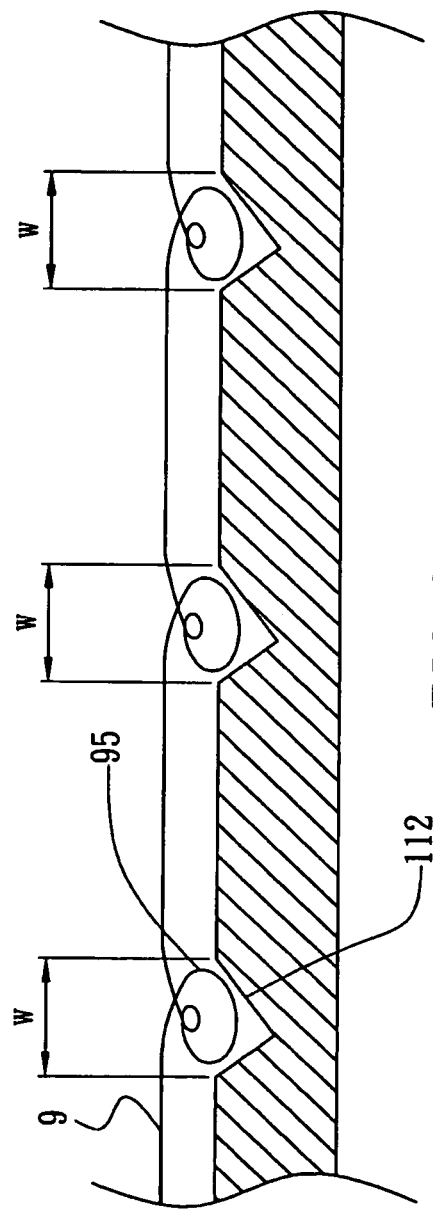
FIG. 3A is a sectional view of a vortex generator and vortices flowing therein according to the present invention.
Figure 3C:
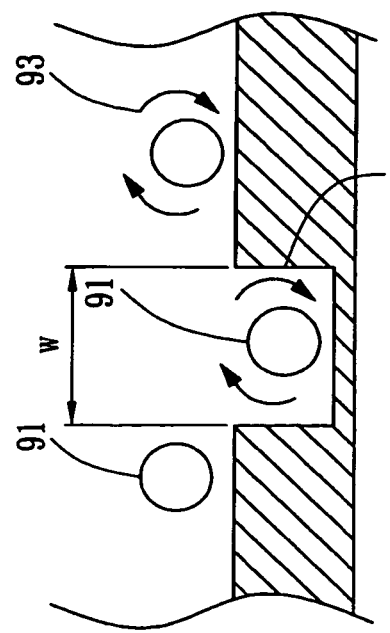
FIG. 3C is a schematic illustration showing a magnetic particle is induced to rotate by the cavities of the vortex generator according to another preferred embodiment of the invention.
Figure 3B:
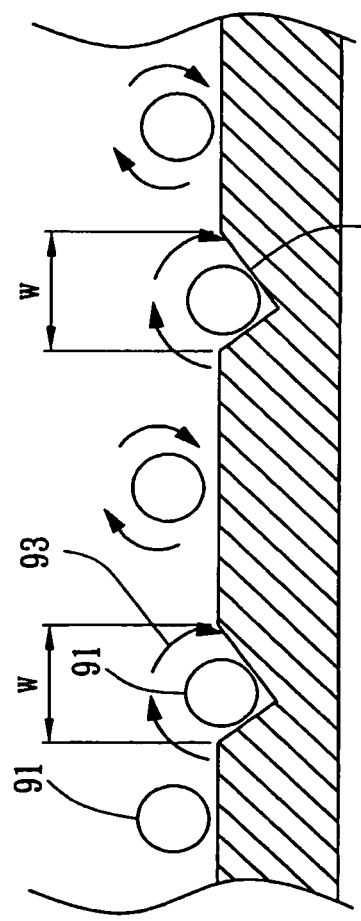
FIG. 3B is a schematic illustration showing a magnetic particle is induced to rotate by the cavities of the vortex generator according to a preferred embodiment of the invention.

Please refer to FIG. 3A, which is a sectional view of a vortex generator and vortices flowing therein according to the present invention. The power generating process of the ferrofluid power generator 1 starts from the ferrofluid 9 is driven by the pump 14 to flow through the plural cavities 112 of the vortex generator 11, where each cavity 112 is disposed for enabling the ferrofluid 9 to generate vortex 95. As seen in FIG. 3B and FIG. 3C, the sectional contour of the cavity 112 is defined by a function, which can be selected from the group consisting of a triangle wave function and a square wave function, but is not limited by the same, in addition, also as seen in FIG. 3B and FIG. 3C that the effective diameter w of each cavity 112 shall be smaller than 100 nanometers. Hence, each magnetic particles 91 is enabled to spin due to the fluid 92 flowing around the same have different velocities caused by vortex while the magnetic particle 91 is flowing passing a serial cavities 112, such that the spin/rotating velocity of the magnetic particle 91 is increased.

Figure 4:
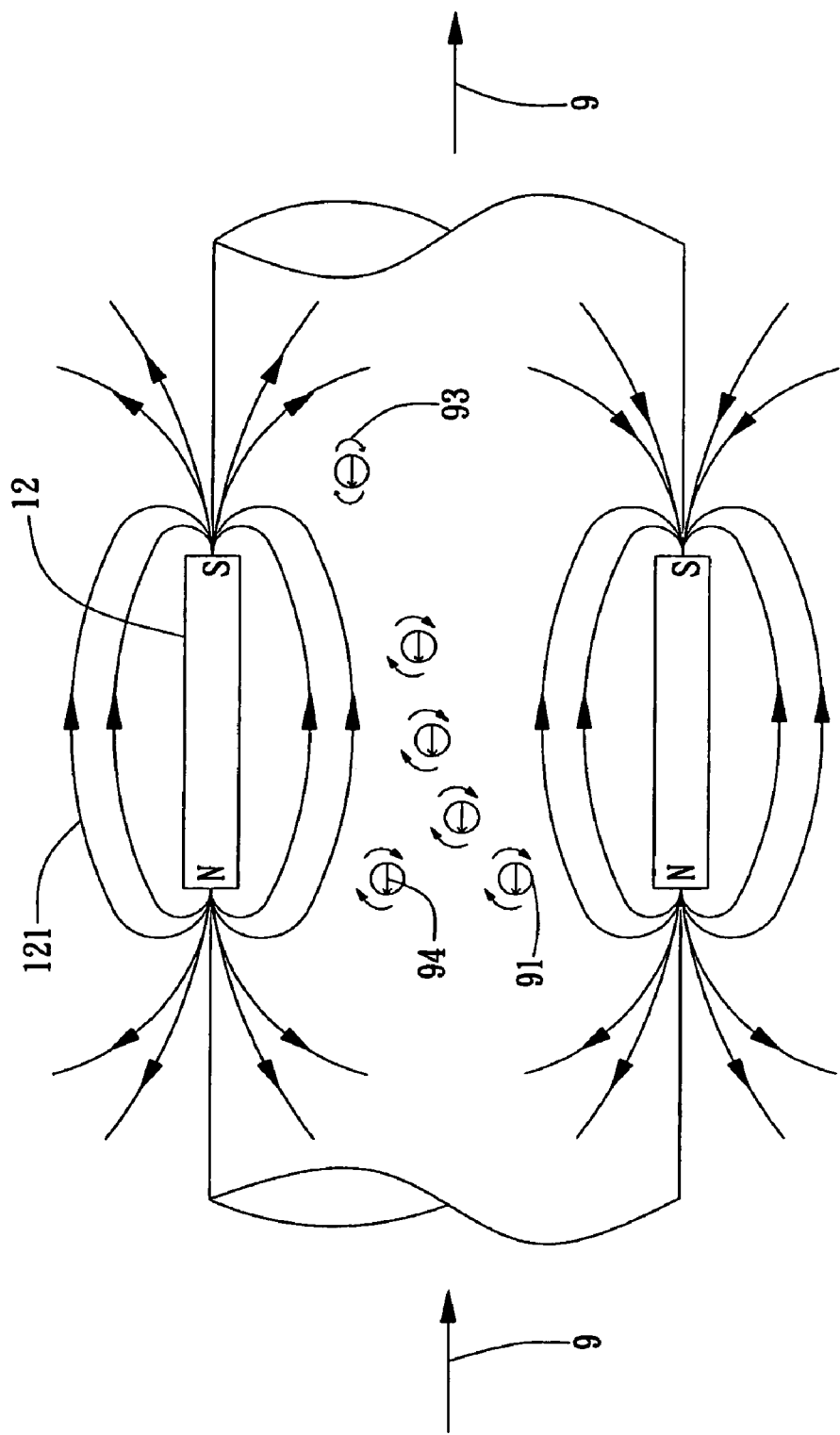
FIG. 4 is a schematic representation of magnetic particles in a magnetic field array according to a preferred embodiment of the present invention.

Please refer to FIG. 4, which is a schematic representation of magnetic particles in a magnetic field array according to a preferred embodiment of the present invention. As seen in FIG. 4, a permanent magnetic field 12 is arranged surrounding the magnetic field array 12 for aligning the magnetic particles 91 to have a coincident polar direction 94 so as to prevent the magnetic fields of the plural magnetic particles 91 from counteracting each other while enabling the synchronizing the rotation of the magnetic particles by eliminating the phase differences of different magnetic particles 91, such that the change of rate of magnetic flux is increase while the magnetic particles 91 enters the induced current unit 13.

Referring to FIG. 2, as the ferrofluid 9 with stably rotating magnetic particles flows passing the induced current unit 13, an induced current 17 is generated on the induced current unit 13 with respect to the change of magnetic flux caused by the changes of the magnetic particles 91 in velocity, magnetic field, and rotating angle. Moreover, the generated induced current 17, which is a high-frequency alternating current, is converted into a direct current 18 to be fed into the actuator 16, such that the actuator 16 can execute all sorts of functions at will.

Figure 5:
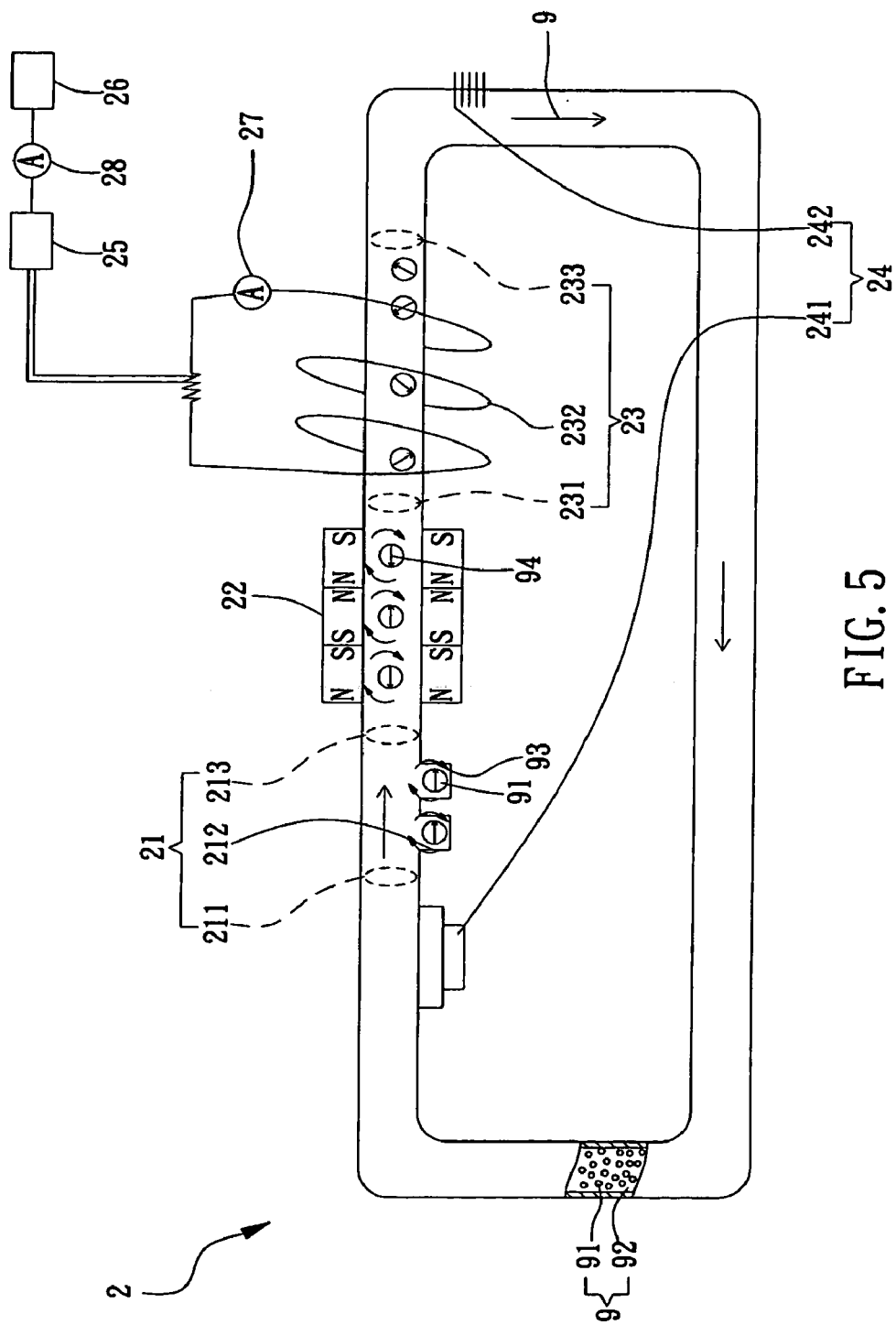
FIG. 5 is a schematic illustration showing the circulation in the ferrofluid power generator with micro vortex generator operating cooperatively with a micro loop thermosyphon cooler according to a preferred embodiment of the present invention.

Please refer to FIG. 5, which is a schematic illustration showing the circulation in the ferrofluid power generator with micro vortex generator operating cooperatively with a micro loop thermosyphon cooler according to a preferred embodiment of the present invention. In the preferred embodiment, the present invention provides a pumpless, naturally circulated ferrofluid power generator with micro vortex generator 2, comprising a vortex generator 21, a magnetic field array 22, an induced current unit 23, a thermosyphone cooler 24, w rectifier, and a actuator 26, together forming a closed circuit having a ferrofluid 9 circulating therein so as to generate an induced current 27, wherein the ferrofluid 9 is composed of a plurality of magnetic particles 91 and a fluid 92, wherein the magnetic particle 91 can be a magnetized nano-scale dipole iron particle or other nano-scale dipole particle, and the fluid 32 can be a non-electrolysis chemical coolant like a fluoride liquid with low boiling point, which can be selected from the group consisting of FC-87, PF-5052, FC-72 and the mixture thereof.

The vortex generator 21 further comprises a first inlet 211, a first outlet 213 and a plurality of cavities 212, capable of accelerating the rotation speed of magnetic particles 91 in a ferrofluid 9 flowing therethrough by virtue of employing the plural cavities 212 to enable the magnetic particles 91 to rotate while the ferrofluid 9 passing through the plural cavities 212.

The induced current unit 23 is substantially a tube having a second inlet 231 coupled to the first outlet 213 of the vortex generator 21, a second outlet 233, and a micro-scale copper coil 232 wrapping around the outer rim thereof, and is capable of accepting the ferrofluid 9 with rotating magnetic particles 91 to flow therein and through so as to induce a change of magnetic flux to occur and generate an induced current 27 accordingly. The magnetic field array 22 may be a permanent magnetic and is connected to the first outlet 213 by an entrance thereof and being connected to the second inlet 231 by an exit thereof.

In addition, an end of the thermosyphone cooler 24 is connected to the first inlet 211, and the other end of the thermosyphone cooler 24 I connected to the second outlet 233, such that the closed circuit is formed. The thermosyphone cooler 24 further comprises a thermal absorption unit 241 and a condenser 242 sequentially arranged therein, wherein the thermal absorption unit 241, being coupled to the vortex generator 21, is used for absorbing thermal energy from a heat source like a CPU of an electronic device, and thus enabling the ferrofluid 9 to be vaporized for pressurizing and pushing the unvaporized ferrofluid so as to drive the plural magnetic particles to flow into the vortex generator 21; and the condenser 242, being positioned over the thermal absorption unit 241 by a specific height while coupled to the second outlet 233 by an inlet thereof and coupled to an inlet of the thermal absorption unit by an outlet thereof, is capable of condensing the vaporized ferrofluid and remixing the same with unvaporized ferrofluid. The rectifier 25 is used for converting the induced current 27, which may be an alternating current with high frequency, into a direct current 28 to be fed into the actuator 26, such that the actuator 16 can execute all sorts of functions at will.

The power generating process of the ferrofluid power generator 1 starts from the ferrofluid 9 is vaporized and thus forming bubbles for pressurizing the remaining unvaporized ferrofluid 9 to flow into the vortex generator 21 while the ferrofluid 9 receives the thermal energy absorbed by the thermal absorption unit 241, where each cavity 212 is disposed for enabling the ferrofluid 9 to generate vortex 95 as seen in FIG. 5. Similar as those seen in FIG. 3B and FIG. 3C, the sectional contour of the cavity 212 is defined by a function, which can be selected from the group consisting of a triangle wave function and a square wave function, but is not limited by the same. Hence, each magnetic particles 91 is enabled to spin due to the fluid 92 flowing around the same have different velocities caused by vortex while the magnetic particle 91 is flowing passing the cavity 212, such that the flowing velocity of the magnetic particle 91 is increased.

After the ferrofluid 9 with the plural magnetic particle 92 flows pass the vortex generator 21, the ferrofluid 9 is fed into and flows pass the magnetic field array 22. Moreover, a permanent magnetic field is arranged surrounding the magnetic field array 22 for aligning the magnetic particles 91 to have a coincident polar direction 94 so as to prevent the magnetic fields of the plural magnetic particles 91 from counteracting each other while enabling the synchronizing the rotation of the magnetic particles by eliminating the phase differences of different magnetic particles 91, such that the change of rate of magnetic flux is increase while the magnetic particles 91 enters the induced current unit 23.

Following, as the ferrofluid 9 with stably rotating magnetic particles flows passing the induced current unit 23, an induced current 27 is generated on the induced current unit 23 with respect to the change of magnetic flux caused by the changes of the magnetic particles 91 in velocity, magnetic field, and rotating angle. Moreover, the generated induced current 27, which is a high-voltage alternating current, is converted into a direct current 28 to be fed into the actuator 26, such that the actuator 16 can execute all sorts of functions at will.

All the ferrofluid 9 passing the induced current unit 23 is fed into the condenser 242 for discharging heat holding therein into the surrounding environment, such that the vaporized ferrofluid 9 is liquefied and can be directed to flow back to the thermal absorption unit 241 by gravity. Hence, the circulation according to the present embodiment is enabled by a method of self-pumping, that is, the circulation can be accomplished without the use of pump. By virtue of this, the ferrofluid power generator of the present invention can have a comparatively wider application, especially in the field of miniature electronic device and micro-mechanical device.

In summation of the description above, the present invention has the easy-to-operate, a simple manufacturing and easy-to-assemble features, and thus can meet with the requirements of the industry and enhances the competitiveness of the industry. The present invention herein enhances the performance than the conventional structure and further complies with the patent application requirements and is submitted to the Patent and Trademark Office for review and granting of the commensurate patent rights.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A ferrofluid power generator with micro vortex generator, comprising:
   a vortex generator, further comprises a first inlet, a first outlet and a plurality of cavities, capable of accelerating the rotation speed of magnetic particles in a ferrofluid flowing therethrough by virtue of employing the plural cavities to enable the magnetic particles to rotate while the ferrofluid passing through the plural cavities; and
   an induced current unit, being substantially a tube having a second inlet coupled to the first outlet of the vortex generator and a second outlet, for accepting the ferrofluid with rotating magnetic particles to flow therein and through so as to induce a change of magnetic flux to occur and generate an induced current accordingly.

2. The ferrofluid power generator with micro vortex generator of claim 1, wherein the sectional contour of the cavity is defined by a function.

3. The ferrofluid power generator with micro vortex generator of claim 2, wherein the contour is defined by a function selected from the group consisting of a triangular wave function and a square wave function.

4. The ferrofluid power generator with micro vortex generator of claim 1, wherein the effective diameter of the cavity is smaller than 100 nanometers.

5. The ferrofluid power generator with micro vortex generator of claim 1, further comprising: a thermosyphone cooler having a thermal absorption unit and a condenser sequentially arranged therein, wherein:
   the thermal absorption unit, being coupled to the first inlet by an outlet thereof, is used for absorbing thermal energy and thus enabling partial ferrofluid to vaporize for pressurizing the remaining ferrofluid so as to drive the plural magnetic particles to flow into the vortex generator; and
   the condenser, being positioned over the thermal absorption unit by a height while coupled to the second outlet by an inlet thereof and coupled to an inlet of the thermal absorption unit by an outlet thereof, is capable of condensing the vaporized ferrofluid passing the induced current unit and remixing the same with unvaporized ferrofluid passing the induced current unit so as to enable the remixed liquid ferrofluid to flow back to the thermal absorption unit by gravity.

6. The ferrofluid power generator with micro vortex generator of claim 5, wherein the ferrofluid is a mixture containing at a liquid of low boiling point.

7. The ferrofluid power generator with micro vortex generator of claim 6, wherein the liquid of low boiling point is a non-electrolysis chemical coolant.

8. The ferrofluid power generator with micro vortex generator of claim 7, wherein the non-electrolysis chemical coolant is a fluoride liquid.

9. The ferrofluid power generator with micro vortex generator of claim 8, wherein the fluoride liquid is a liquid selected from the group consisting of FC-87, PF-5052, FC-72 and the mixtures thereof.

10. The ferrofluid power generator with micro vortex generator of claim 6, wherein the mixture further contains water.

11. The ferrofluid power generator with micro vortex generator of claim 1, wherein a pump is used for driving the ferrofluid to circulate.

12. The ferrofluid power generator with micro vortex generator of claim 11, wherein the pump is a micromechanical pump.

13. The ferrofluid power generator with micro vortex generator of claim 1, further comprising: a magnetic field array, being connected to the first outlet by an entrance thereof and being connected to the second inlet by an exit thereof, wherein the magnetic field array is used for providing an evenly distributed magnetic filed so as to enable the plural magnetic particles to rotate in synchronization.

14. The ferrofluid power generator with micro vortex generator of claim 13, wherein the magnetic field array is a permanent magnet, capable of aligning the magnetic particles to have a coincident polar direction so as to prevent the magnetic fields of the plural magnetic particles from counteracting each other.

15. The ferrofluid power generator with micro vortex generator of claim 1, wherein the induced current unit comprises a coil wrapping around the outer rim thereof.

16. The ferrofluid power generator with micro vortex generator of claim 15, wherein the coil is a micro-scale copper coil.

17. The ferrofluid power generator with micro vortex generator of claim 1, wherein the magnetic particle is a nano-scale iron particle.

18. The ferrofluid power generator with micro vortex generator of claim 1, the induced current is an alternating current of high frequency.

19. The ferrofluid power generator with micro vortex generator of claim 1, the induced current is converted into a direct current by an external rectifier.

* * * * *